United States Patent
Kitou et al.

[11] Patent Number: 5,977,936
[45] Date of Patent: Nov. 2, 1999

[54] RASTER SCAN DISPLAY FOR REDUCING VERTICAL MOIRE PHENOMENON

[75] Inventors: Kouji Kitou, Hiratsuka; Isao Yoshimi, Mobara, both of Japan

[73] Assignee: Hitachi, Ltd., Tokyo, Japan

[21] Appl. No.: 08/705,657

[22] Filed: Aug. 30, 1996

[30] Foreign Application Priority Data

Sep. 1, 1995 [JP] Japan .................................. 7-224984

[51] Int. Cl.$^6$ .................. G09G 1/06; H04N 3/22
[52] U.S. Cl. .................. 345/12; 345/10; 348/806
[58] Field of Search ............. 345/10–15; 315/369–371, 315/386, 391, 399, 382, 382.1; 348/806, 828

[56] References Cited

U.S. PATENT DOCUMENTS

| | | | |
|---|---|---|---|
| 4,037,133 | 7/1977 | Sennik | 315/382.1 |
| 4,242,714 | 12/1980 | Yoshida et al. | 315/371 |
| 5,430,502 | 7/1995 | Yamazaki et al. | 348/806 |
| 5,440,353 | 8/1995 | Yamazaki et al. | 348/806 |
| 5,473,223 | 12/1995 | Murakami | 315/371 |
| 5,504,539 | 4/1996 | Jang | 315/371 |
| 5,619,285 | 4/1997 | Kobayashi | 348/806 |
| 5,672,939 | 9/1997 | Hsiesh | 315/382.1 |
| 5,767,632 | 6/1998 | Yoshida et al. | 315/370 |

*Primary Examiner*—Bipin H. Shalwala
*Assistant Examiner*—David L Lewis
*Attorney, Agent, or Firm*—Antonelli, Terry, Stout & Kraus, LLP

[57] ABSTRACT

A display is disclosed for reducing a vertical moire phenomenon of the display with a simple circuit and without causing noises on an image plane. The display comprises a moire cancelling amplifier for flowing a vertical moire cancellation current at a frequency of 1/n of a vertical deflection coil frequency to a vertical deflection coil of the display, a frequency divider for generating the frequency of 1/n of the vertical deflection frequency, a vertical oscillator, and a vertical output circuit.

15 Claims, 4 Drawing Sheets

FIG. 1
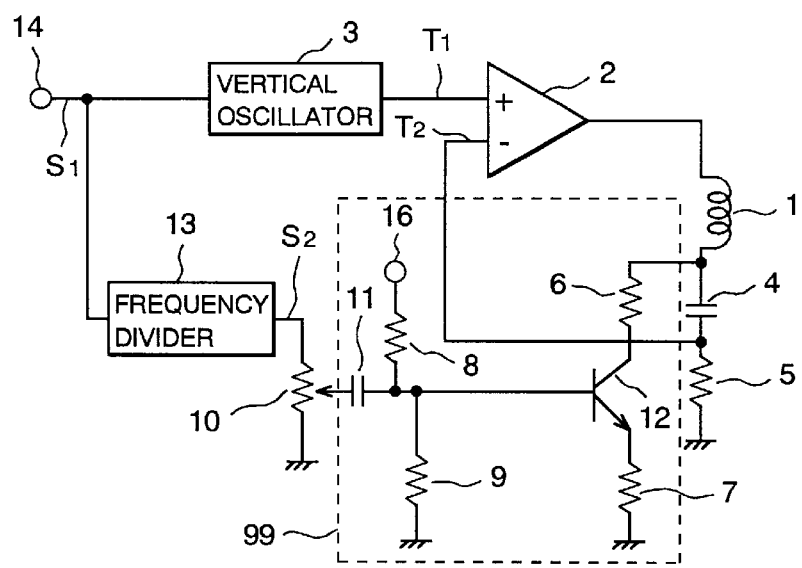
FIG. 2a  S₁ 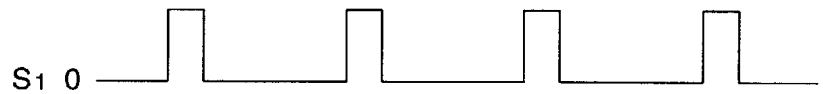
FIG. 2b  S₂ 
FIG. 2c  S₃ 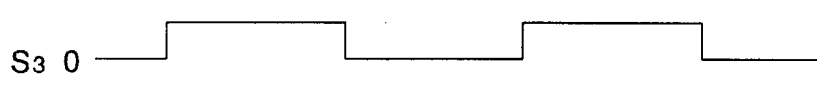
FIG. 2d  S₄ 

RASTER SCAN DISPLAY FOR REDUCING VERTICAL MOIRE PHENOMENON

BACKGROUND OF THE INVENTION

The present invention relates to a raster scan type display using a cathod ray tube(CRT).

With the growing popularity of a computer, various numbers of display dots have been used and deflection frequencies of a display have also become various. Then, a multi-scanning display which can display signals of the various deflection frequencies by a single apparatus is becoming popular.

In the multi-scanning display, however, since there are various numbers of scanning lines, it is difficult to select a vertical pitch of a shadow mask so that no moire phenomenon occurs. Consequently, various techniques of moire cancellation have been proposed.

As conventional techniques regarding the display of this kind in which the moire phenomenon is cancelled, there are Japanese Laid-open Patent Publication Nos. HEI 5-236290 (1993), HEI 5-236291(1993), and the like.

In the conventional display, a series circuit of a resistor and a switch is connected in parallel to an S-shaped capacitor in a vertical deflection circuit. By opening and closing the switch at half-frequency of the vertical deflection frequency, a DC current is superposed to a vertical deflection current and a display position is oscillated. As a result, the moire phenomenon is reduced. However, No consideration has been given to noises on an image plane which are caused by the use of the switch in the prior art.

SUMMARY OF THE INVENTION

It is, consequently, an object of the present invention to provide a display which can reduce a moire phenomenon without causing noises on an image plane.

In order to achieve the object, a vertical deflection circuit of a display is provided with a signal generator and a moire cancelling amplifier that flows a vertical moire cancellation current.

When a vertical synchronizing(sync) signal is supplied, the signal generator generates a voltage wave at a frequency which is 1/n of a vertical deflection frequency and supplies the voltage wave to the moire cancelling amplifier where n is an integer of at least 2.

The moire cancelling amplifier flows a vertical moire cancellation current at a frequency which is 1/n of the vertical deflection frequency to a vertical deflection coil wherein n is an integer of at least 2.

Consequently, a vertical display position on the image plane is oscillated at the frequency of 1/n of the vertical deflection frequency, so that the moire phenomenon can be reduced. Since no switch is used, noises on the image plane do not occur.

BRIEF DESCRIPTION OF THE DRAWINGS

FIG. 1 is a circuit diagram showing a first embodiment of a display of the present invention;

FIG. 2 is a waveform diagram for explaining the operation of FIG. 1;

DETAILED DESCRIPTION OF THE PREFERRED EMBODIMENTS

Figure 3A:
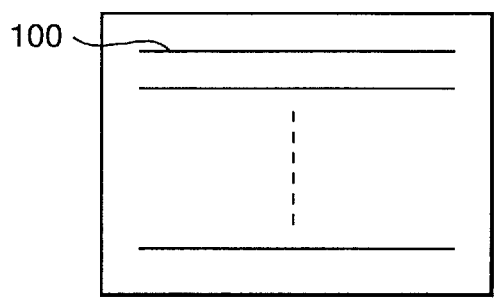
FIG. 3 is a diagram for explaining the operation of FIG. 1.

Referring now to FIG. 1, there is shown a circuit diagram of the first embodiment of the present invention. The display of FIG. 1 includes a vertical deflection coil 1, a vertical output circuit 2, a vertical oscillator 3, a capacitor 4, resistors 5, 6, 7, 8, and 9, a variable resistor 10, a capacitor 11, a transistor 12, a generator including a frequency divider 13, a vertical synchronizing signal input terminal 14, a power source input terminal 16, and a moire cancelling amplifier 99.

A vertical synchronous signal S1 at a vertical deflection frequency shown in FIG. 2a is supplied to the vertical synchronizing signal input terminal 14, and the signal S1 is sent to the vertical oscillator 3 and the frequency divider 13. The generator including a frequency divider 13 divides the signal S1 at the vertical deflection frequency so that an output signal S2 is generated at 1/n of the vertical deflection frequency, where n is an integer of 2 or larger. A vertical sawtooth voltage as an output of the vertical oscillator 3 is supplied to a non-inverting terminal T1 of the vertical output circuit 2. A voltage of the resistor 5 which detects a vertical deflection current flowing through the vertical deflection coil 1 and the capacitor 4 is supplied to an inverting terminal T2 of the vertical output circuit 2. The vertical deflection current waveform coincides with the vertical sawtooth voltage waveform by a negative feedback control.

Figure 3B:
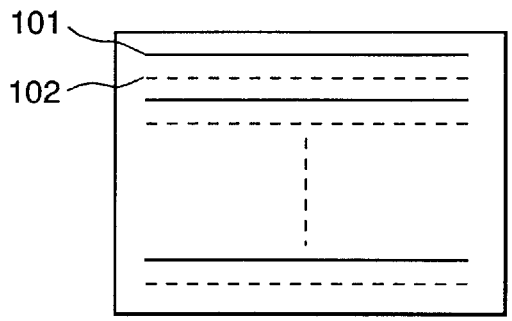

On the other hand, an amplitude of an output S2 of the frequency divider 13 as shown in FIG. 2b is adjusted by the variable resistor 10 as shown in FIG. 2c and the resultant signal is supplied to the moire cancelling amplifier 99. The moire cancelling amplifier 99 comprises the resistors 6, 7, 8, and 9, the capacitor 11, and the transistor 12. A collector current of the transistor 12 is as shown in FIG. 2d. The collector current is consequently added and superposed to the vertical deflection current and a display position on the image plane is oscillated at a frequency of 1/n of the vertical deflection frequency. Such a state will be described with reference to FIG. 3 wherein n is an integer of 2, but can be an integer greater than 2. FIG. 3a shows a case where an amplitude supplied to the moire cancelling amplifier 99 is set to zero by the variable resistor 10 and a position 100 of a scanning line is fixed. FIG. 3b shows a case where the amplitude supplied to the moire cancelling amplifier 99 is increased by the variable resistor 10. Positions 101 and 102 of the scanning line are alternately and repeatedly changed. As a result, the moire phenomenon can be reduced. Since no switch is used, there is also an effect such that noises on the image plane do not occur.

Figure 4:
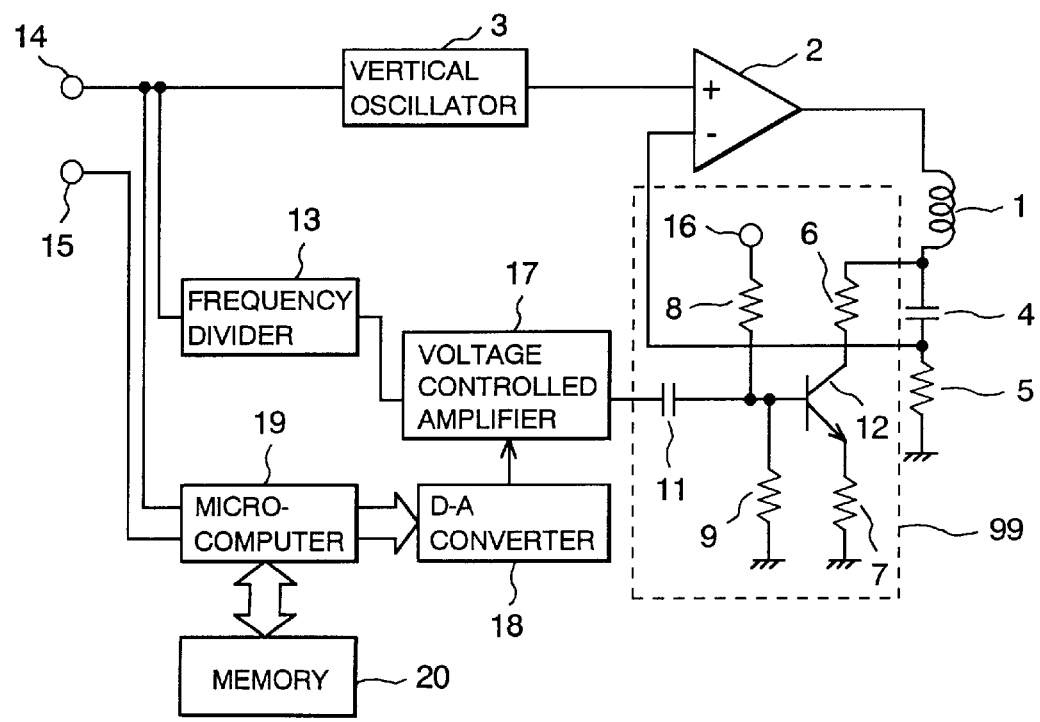
FIG. 4 is a circuit diagram showing a second embodiment of the display according to the present invention.

FIG. 4 is a circuit diagram showing a second embodiment of the display of the invention. Like reference characters designate like or corresponding parts in FIG. 1. The display further includes an input terminal of a horizontal synchronizing signal input terminal 15, a voltage controlled amplifier 17, a DA converter 18, a microcomputer 19, and a memory 20.

A point of difference from FIG. 1 is that the variable resistor 10 is replaced by the voltage controlled amplifier 17 and the voltage amplitude supplied to the moire cancelling amplifier 99 is adjusted by the microcomputer 19.

Since an optimum oscillating amount of a display position, that is, the voltage amplitude supplied to the moire cancelling amplifier 99 differs with respect to the number of scanning lines or the like according to an input signal, it is necessary to adjust the variable resistor 10 each time the input signal is changed in FIG. 1.

In FIG. 4, the microcomputer 19 recognizes a signal supplied to the display by the vertical and horizontal synchronizing signals inputted to the input terminal 14 of the vertical synchronizing signal and the input terminal 15 of the horizontal synchronizing signal, reads out voltage amplitude adjustment data corresponding to the signal from the memory 20 and sends the read data to the DA converter 18. A voltage amplitude adjustment voltage is generated from the DA converter 18 and is added to a control terminal of the voltage controlled amplifier 17. Consequently, the voltage amplitude supplied to the moire cancelling amplifier 99 is adjusted and the oscillating amount of the display position is automatically optimized according to the input signal.

Figure 5:
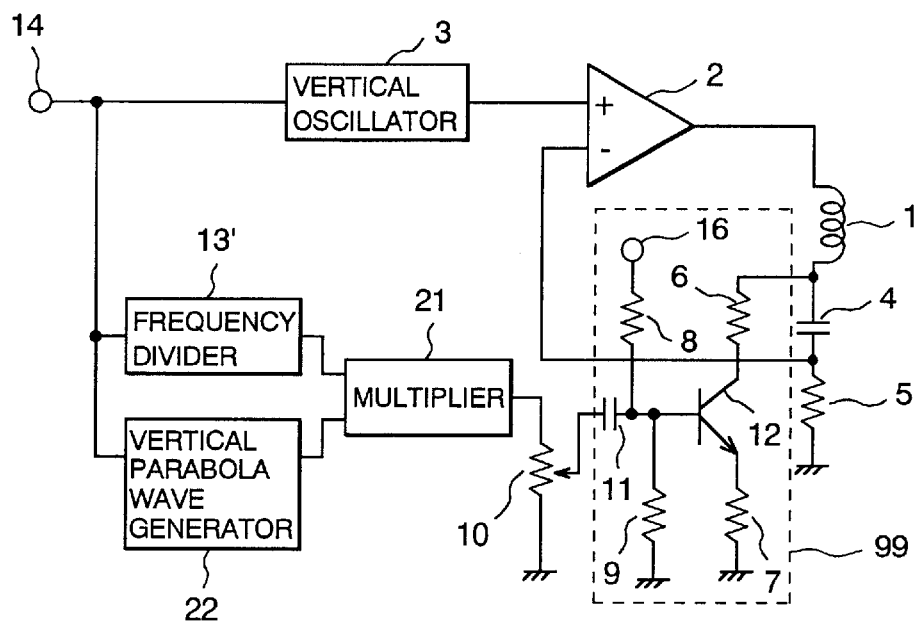
FIG. 5 is a circuit diagram showing a third embodiment of the display according to present invention.

FIG. 5 is a circuit diagram showing a third embodiment of the display of the present invention. Shown in FIG. 5 are a frequency divider 131, a multiplier 21, and a vertical parabola wave generator 22.

The operation of FIG. 5 will be described with reference to FIG. 6.

Since the display image plane of the CRT is not a sphere, the oscillation amount of the display position is larger toward the upper or lower end on the image plane when the moire cancelling current is fixed. That is, it is necessary to reduce the moire cancelling current toward the upper or lower end on the plane.

Figure 6A:
FIG. 6 is a waveform diagram for explaining the operation of FIG. 5.
Figure 6B:
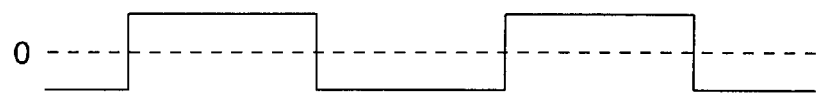
Figure 6C:
Figure 6D:
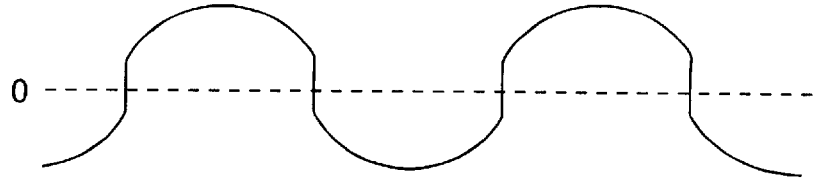

In FIG. 5, an output voltage (FIG. 6b) of the frequency divider 13' and a vertical parabola voltage FIG. 6c) as an output of the vertical parabola voltage generator 22 are multiplied by the multiplier 21. An output voltage shown in FIG. 6d is obtained from the multiplier 21 and the moire cancelling current is decreased in the upper and lower parts of the image plane, so that a constant oscillation of the display position can be realized irrespective of the position on the image plane. FIG. 6a shows the vertical synchronizing signal.

Figure 7:
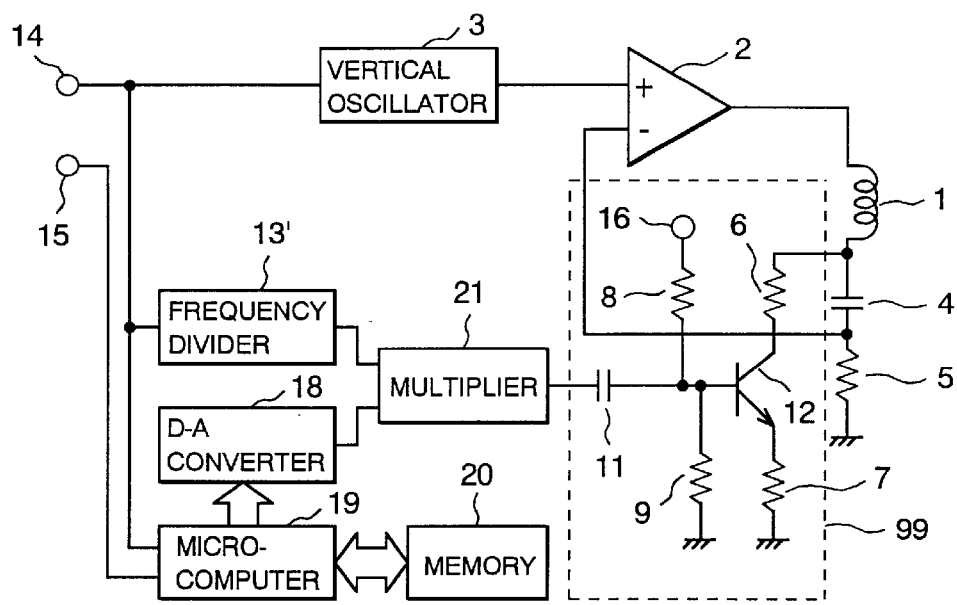
FIG. 7 is a circuit diagram showing a fourth embodiment of the display according to the present invention.

FIG. 7 is a circuit diagram showing a fourth embodiment of the display of the present invention.

The operation of FIG. 7 will now be described with reference to FIG. 8.

A point of difference from FIG. 5 is that the vertical parabola wave generator 22 is replaced by the DA converter 18, microcomputer 19, and memory 20, and the moire cancelling current in an optional correction waveform is realized.

It is preferable that the oscillation amount of the display position can be optionally changed depending on the position on the image plane in accordance with a variation in brightness or the user's preference.

Figure 8A:
FIG. 8 is a waveform diagram for explaining the operation of FIG. 7.
Figure 8B:
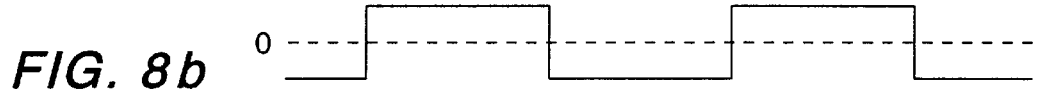
Figure 8C:
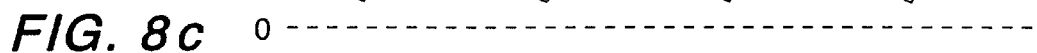
Figure 8D:
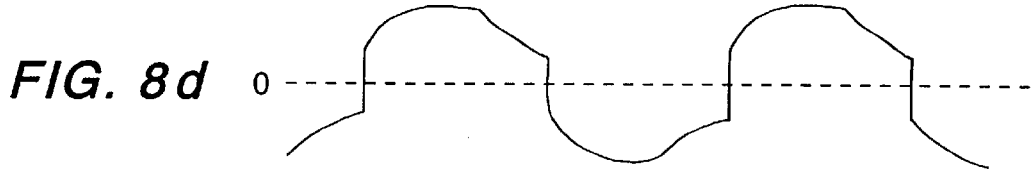

In FIG. 7, the microcomputer 19 recognizes a signal inputted to the display by the vertical and horizontal synchronizing signals supplied to the vertical synchronizing signal input terminal 14 and the horizontal synchronizing signal input terminal 15, reads out correction waveform data corresponding to the signal from the memory 20 and sends the read data to the DA converter 18. A correction waveform shown in FIG. 8c is generated from the DA converter 18 and is added to the multiplier 21. An output voltage shown in FIG. 8d is obtained from the multiplier 21, and a moire canceling current according to the position of the image plane is obtained, so that the moire cancellation according to the variation in brightness or the user's preference can be realized. FIG. 8a shows the vertical synchronizing signal.

As mentioned above, since the vertical moire phenomenon can be reduced by a simple circuit without causing noises on the image plane, various video signals can be displayed on the display of the invention at a high picture quality.

We claim:

1. A display having a vertical deflection circuit:
    a moire cancelling amplifier for flowing a vertical moire cancelling current at a frequency of 1/n (n is an integer equal to 2 or larger) of a vertical deflection frequency to a vertical deflection coil; and
    a generator for generating a signal at the frequency of 1/n of the vertical deflection frequency and supplying the signal to said moire cancelling amplifier.

2. The display according to claim 1, wherein the generator includes a frequency divider generating an output and a circuit for adjusting a voltage amplitude of the output generated from the frequency divider.

3. The display according to claim 2, wherein the voltage amplitude adjusting circuit which adjusts the output voltage amplitude is a voltage controlled amplifier.

4. A display having a vertical deflection circuit comprising:
    a moire cancelling amplifier for flowing a vertical moire cancelling current at a frequency of 1/n (n is an integer equal to 2 or larger) of a vertical deflection frequency to a vertical deflection coil; and
    a generator for generating a signal at the frequency of 1/n of the vertical deflection frequency and supplying the signal to said moire cancelling amplifier;
    wherein the generator includes a frequency divider generating an output, a multiplier for multiplying the output of the frequency divider and an output of a vertical correction wave generator.

5. The display according to claim 4, wherein the vertical correction wave generator is a vertical parabola wave generator.

6. The display according to claim 4, wherein the generator includes a DA converter and a memory.

7. A display having a vertical deflection circuit comprising:
    a generator for generating a signal at a frequency of 1/n of a vertical deflection frequency and providing an output of the signal, n being an integer of at least 2; and
    a moire cancelling amplifier for amplifying the signal from the generator and for flowing a vertical moire cancelling current at 1/n of the vertical deflection frequency to a vertical deflection coil.

8. The display according to claim 7, wherein the generator includes a frequency divider generating an output and a circuit for adjusting a voltage amplitude of the output generated from the frequency divider and providing the signal from the generator.

9. The display according to claim 8, wherein the voltage amplitude adjusting circuit which adjusts the output voltage amplitude is a voltage controlled amplifier.

10. A display according to claim 1, wherein the display is supplied with at least one type of signal, and further comprising circuit means for adjusting a physical characteristic of said vertical moire cancelling current in accordance with the at least one type of signal supplied to the display.

11. The display according to claim 10, wherein said circuit means adjusts the amplitude of said vertical moire cancelling current.

12. The display according to claim 11, wherein said circuit means further comprises:
- a memory for storing amplitude adjustment data corresponding to the at least one type of signal supplied to the display;
- a microcomputer for discriminating the at least one type of the signal supplied to the display based on horizontal and vertical synchronous signals and reading out the amplitude adjustment data corresponding to the at least one type of the signal supplied to the display;
- a digital-analog converter for converting the amplitude adjustment data read out from said memory by said microcomputer to an analog signal; and
- a voltage controlled amplifier adjusting the signal from said generator on the basis of the outputted signal from said digital-analog converter.

13. A display according to claim 7, wherein the display is supplied with at least one type of signal, and further comprising circuit means for adjusting a physical characteristic of said vertical moire cancelling current in accordance with the at least one type of signal supplied to the display.

14. The display according to claim 13, wherein said circuit means adjusts the amplitude of said vertical moire cancelling current.

15. The display according to claim 14, wherein said circuit means further comprises:
- a memory for storing amplitude adjustment data corresponding to the at least one type of signal supplied to the display;
- a microcomputer for discriminating the at least one type of the signal supplied to the display based on horizontal and vertical synchronous signals and reading out the amplitude adjustment data corresponding to the at least one type of the signal supplied to the display;
- a digital-analog converter for converting the amplitude adjustment data read out from said memory by said microcomputer to analog signal; and
- a voltage controlled amplifier adjusting the signal from said generator on the basis of the outputted signal from said digital-analog converter.

* * * * *